United States Patent [19]

Hockaday et al.

[11] Patent Number: 5,175,781
[45] Date of Patent: Dec. 29, 1992

[54] ATTACHING OPTICAL FIBERS TO INTEGRATED OPTIC CHIPS

[75] Inventors: Bruce D. Hockaday, Vernon; W. Schuyler Montgomery, East Hartford; Geary R. Carrier, Hampton; Paul G. Suchoski, Jr., East Hartford, all of Conn.

[73] Assignee: United Technologies Corporation, Hartford, Conn.

[21] Appl. No.: 774,906

[22] Filed: Oct. 11, 1991

[51] Int. Cl.$^5$ .............................................. G02B 6/30
[52] U.S. Cl. .......................................... 385/49; 385/50
[58] Field of Search ................ 385/2, 14, 49, 50, 51, 385/52

[56] References Cited

U.S. PATENT DOCUMENTS

| | | | |
|---|---|---|---|
| 4,744,619 | 5/1988 | Cameron | 385/52 |
| 4,765,702 | 8/1988 | Dohan et al. | 385/49 X |
| 4,796,975 | 1/1989 | Lukas et al. | 385/50 |
| 4,871,226 | 10/1989 | Courtney et al. | 385/49 X |
| 4,892,374 | 1/1990 | Ackerman et al. | 385/49 |
| 4,973,133 | 11/1990 | Matz et al. | 385/49 |
| 4,984,861 | 1/1991 | Suchoski, Jr. et al. | 385/14 |
| 5,046,808 | 9/1991 | Chang | 385/49 X |
| 5,059,763 | 10/1991 | O'Brien et al. | 385/49 X |
| 5,071,215 | 12/1991 | Hockaday | 385/49 |
| 5,073,002 | 12/1991 | Hockaday | 385/50 |

Primary Examiner—John D. Lee
Assistant Examiner—Phan T. Heartney
Attorney, Agent, or Firm—Richard H. Kosakowski

[57] ABSTRACT

A method of attaching an optical fiber to an IOC includes the step of forming an alignment groove in the waveguide surface of the IOC by utilizing a laser ablation system to remove a predetermined portion of the IOC material. Next, a dicing saw or other cutting means is used to cut into the IOC at a depth less than the thickness of the IOC, the cut forming a cut surface which is normal or at an angle with respect to both an optical axis of the waveguide and to an axis of the alignment groove, such step of cutting performing the additional function of optically polishing the cut surface. Next, an optical fiber is disposed within the alignment groove, and the fiber core is optically aligned with the optical axis of the waveguide by translational and rotational positioning of the fiber end face adjacent to the cut surface. The fiber end face is then secured to the cut surface with adhesive or other suitable means, and the fiber is attached to the IOC within the alignment groove with adhesive or other suitable means.

9 Claims, 3 Drawing Sheets

ATTACHING OPTICAL FIBERS TO INTEGRATED OPTIC CHIPS

CROSS REFERENCE TO RELATED APPLICATIONS

Some of the subject matter disclosed and claimed herein is also disclosed and claimed in a commonly owned, copending U.S. patent application filed on even date herewith by Hockaday, et al., Ser. No. 07/774,933, entitled Attaching Optical Fibers To Integrated Optic Chips.

DESCRIPTION

1. Technical Field

This invention relates to integrated optics, and more particularly to attaching optical fibers to integrated optic chips.

2. Background Art

In the art of attaching optical fibers to integrated optic chips (IOCs), it is critical that for maximum optical energy coupling between the fiber and IOC, that a waveguide formed on, a surface of the IOC be in precise translational and rotational alignment with the fiber core before affixing the fiber to the IOC. Due to the typically small diameters (e.g., 2 to 10 microns) of both the core and waveguide, a small amount of misalignment therebetween may result in significant coupling loss of optical energy. As a result of this precise alignment constraint and of the relatively inefficient attachment methods existing in the prior art, attaching fibers to IOCs has heretofore been a time consuming process accounting for approximately 75 percent of the product cost.

For example, it is known in the art to use support blocks with V-grooves formed therein to support the fiber and provide a lateral and angular alignment of the fiber core and waveguide. However, this approach does not provide the desired precise alignment of each individual core and waveguide pair, and, furthermore, results in alignment instability over the desired operating temperature range.

It is also known to affix a support block to the IOC and attach the fiber with adhesive to both the IOC and block, as illustrated in U.S. Pat. No. 4,744,619 to Cameron. However, this method is inefficient in achieving the required precise optical alignment because of the use of elaborate micropositioner and imaging equipment apparatus. Also, use of positioners is labor and capital intensive, and does not allow simultaneous positioning of closely spaced optical fibers at the IOC output.

Further, U.S. Pat. No. 4,871,226, to Courtney et al. and assigned to the assignee of the present invention, teaches a procedure for attaching a fiber to the IOC which first involves polishing the end face(s) of the IOC to an optical finish. It has been found that to increase the optical energy coupling efficiency between the fiber and IOC, the IOC end face surface must be a knife edge and not be rounded to any relative extent. Polishing accomplishes this knife edge. The procedure also teaches the use of carrier blocks for the fibers which attach to the corresponding IOC end faces.

However, it has been found that the procedure in Courtney et al. does not produce an attachment of the fiber to the IOC so as to be able to maintain the precise alignment across the entire MIL SPEC temperature or mechanical shock range. Further, the procedure is labor-intensive, time-consuming, and difficult to automate, requiring a relatively high degree of skilled labor to insure its success.

DISCLOSURE OF INVENTION

Objects of the present invention include provision of an inexpensive and time-saving method of attaching an optical fiber in precise optical alignment to a waveguide in an IOC.

Further objects of the present invention include provision of a method of attaching an optical fiber in precise optical axis alignment to a waveguide in an IOC, such attachment maintaining such precise alignment across a wide (e.g., MIL SPEC) temperature and mechanical shock range.

According to the present invention, a method of attaching an optical fiber to an IOC includes the step of forming an alignment groove in the waveguide surface of the IOC by utilizing a laser ablation system to remove a predetermined portion of the IOC material; a dicing saw or other cutting means is used to cut into the IOC at a depth less than the thickness of the IOC, the cut forming a cut surface which is normal or at an angle with respect to both an optical axis of the waveguide and to an axis of the alignment groove, such step of cutting performing the additional function of optically polishing and providing the knife edge on the cut surface, the steps of forming the groove with the ablation system and cutting with the dicing saw to form the cut surface may be performed in either order; next, an optical fiber is disposed within the alignment groove, and the fiber core is optically aligned with the optical axis of the waveguide by translational and rotational positioning of the fiber end face adjacent to the cut surface; the fiber end face is then secured to the cut surface with adhesive or other suitable means, and the fiber is attached to the IOC within the alignment groove with adhesive or other suitable means.

The method of the present invention achieves precise alignment of the core of an optical fiber to a waveguide in an inexpensive and time-saving manner through the combination of the precisely located alignment groove and cut surface. Specifically, manufacturing and assembly time are significantly reduced over prior art methods. At the same time, such precise alignment is maintained across a wide temperature and mechanical shock range. The present invention thus facilitates the production of IOC devices such as fiber optic gyros in large quantities on a commercial basis.

These and other objects, features and advantages of the present invention will become more apparent in light of the detailed description of a best mode embodiment thereof, as illustrated in the accompanying drawings.

BEST MODE FOR CARRYING OUT THE INVENTION

Figure 1:
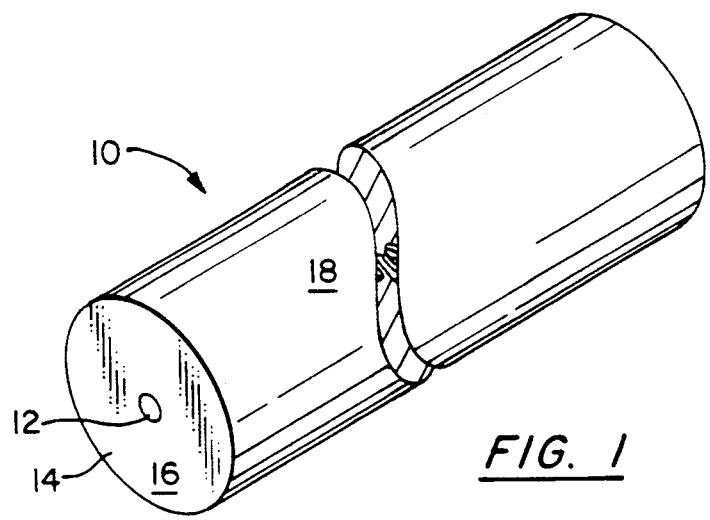
FIG. 1 is a perspective view of a portion of an optical fiber.

In FIG. 1 is illustrated a perspective view of a portion of an optical fiber 10. The fiber 10 typically comprises a commercially available, single mode fiber, having a core diameter in the range of, e.g., 2 to 10 microns. The fiber has an inner core portion 12, through which light is constrained to travel by an outer cladding portion 14 of different refractive index than that of the core 12. Also illustrated is an end face 16 of the fiber, which is normally cleaved or optically polished by suitable means, and a fiber outer surface 18. The overall diameter of the fiber may be approximately 125 microns.

Figure 2:
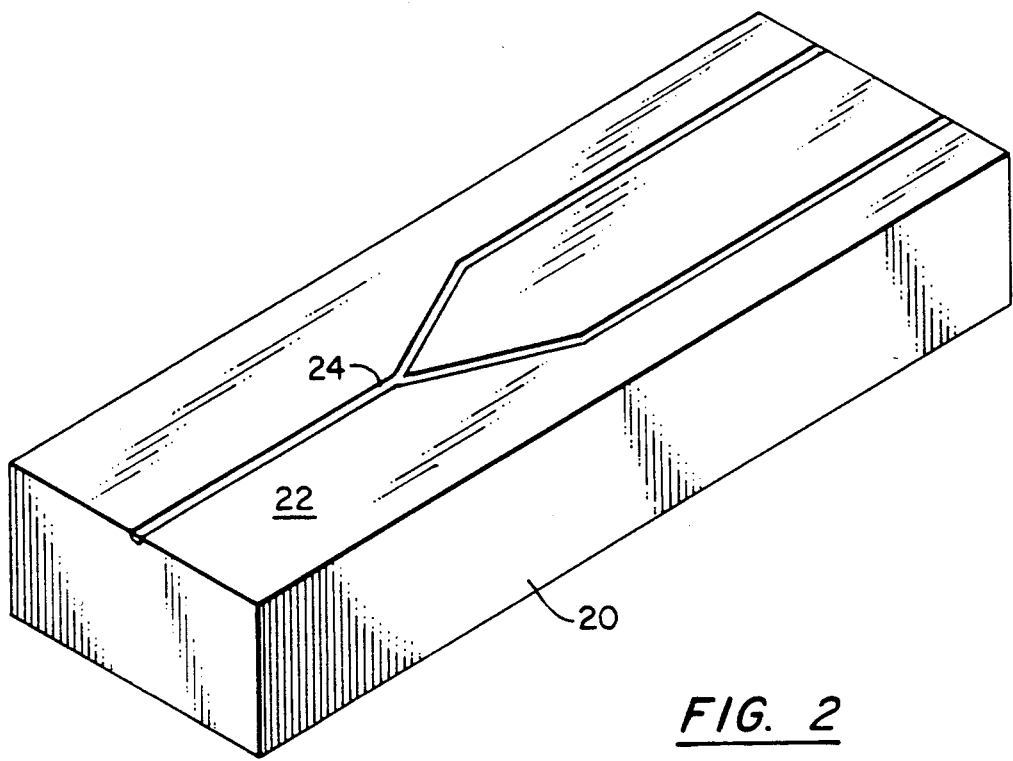
FIG. 2 is a perspective view of an IOC.

In FIG. 2 is illustrated a perspective view of a rectangular-shaped IOC 20 fabricated from, e.g., X-cut, Y-propagation lithium niobate, $LiNbO_3$. However, the IOC is not limited as such; rather, the IOC may be of other cuts and associated propagations. For example, if desired, the IOC may comprise other suitable material or crystal cuts such as lithium tantalate, $LiTaO_3$, or Z-cut lithium niobate.

The IOC 20 has formed on, a top surface 22 a, e.g., Y-shaped optical waveguide 24. The waveguide 24 may be formed by means well known in the art, such as proton exchange or titanium indiffusion, or by an annealed proton exchange ("APE TM") method disclosed and claimed in U.S. Pat. No. 4,984,861 to Suchoski, Jr. et al. and assigned to the assignee of the present invention, the Suchoski, Jr. et al. patent being hereby incorporated by reference.

A simple Y-shaped waveguide is illustrated. It is to be understood, however, that the shape or form of the waveguide is irrelevant to the broadest scope of the present invention; the IOC may have any type or form of waveguide, along with other well known devices (e.g., light energy phase modulators) formed on, an IOC surface in accordance with well known techniques.

Figure 3:
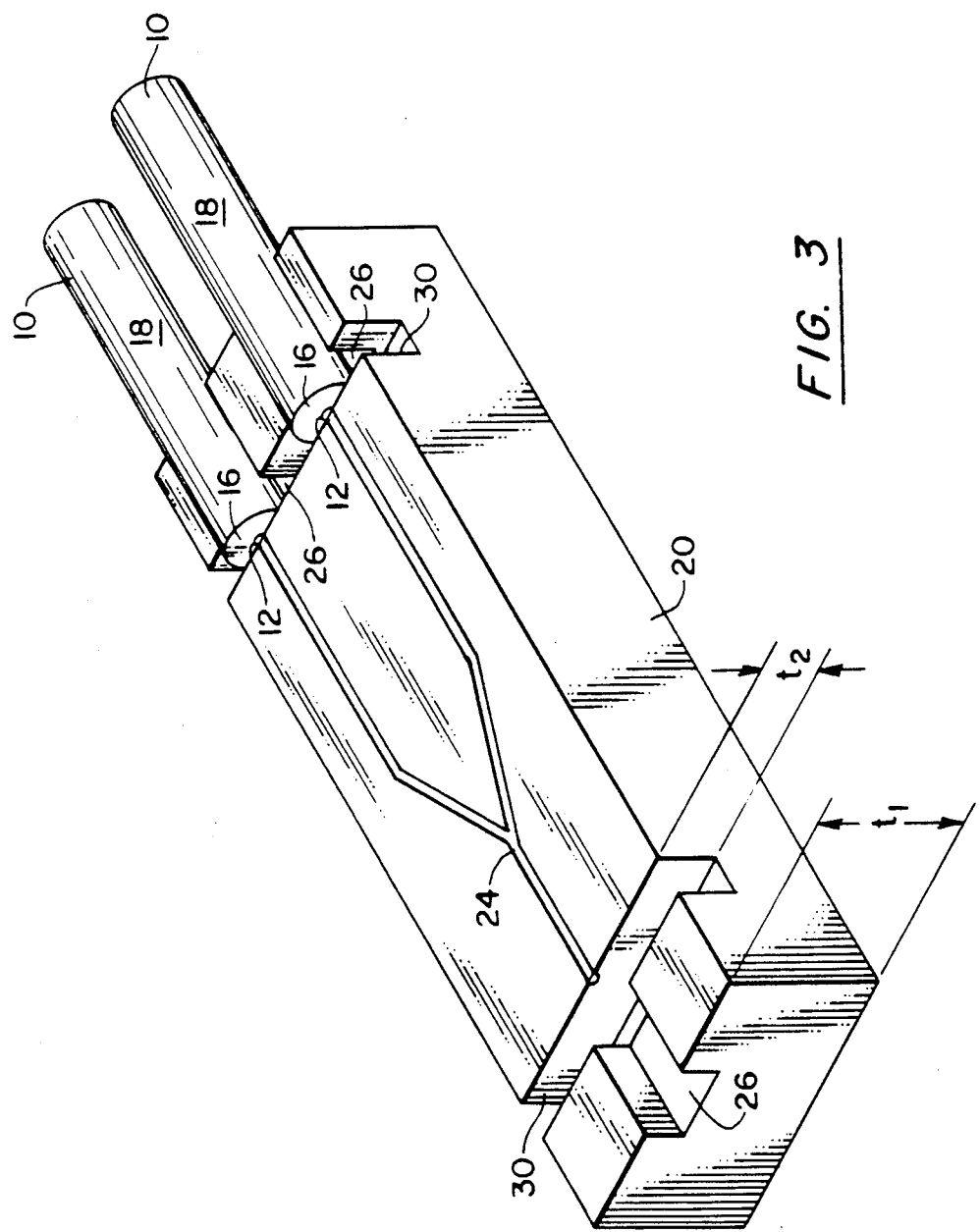
FIG. 3 is a perspective view of the IOC of FIG. 2 as operated on by the method of the present invention.

Referring to FIG. 3, the IOC 20 is prepared for attachment to the fiber by utilizing a commercially available laser ablation system to form one or more alignment grooves 26 in the waveguide surface 22 of the IOC. An exemplary laser ablation system is a computer controlled system provided by Image Micro Systems, Inc., Billerica, Mass. The ablation system uses an ultraviolet (UV) excimer laser at a wavelength that the $LiNbO_3$ IOC material strongly absorbs. Computer control of the ablation system allows the location, depth and width of the alignment grooves to be controlled to a relatively high degree of accuracy of 2 microns.

The location, depth and width of each alignment groove is dependent upon the location of the waveguide 24 on the IOC 20 and upon the diameter of the fiber 10. For example, with a typical fiber diameter of 125 microns, the depth of the groove is approximately 62.5 microns, i.e., equal to the radius of the fiber, while the width of the groove is 125 microns.

Use of the laser ablation system produces the aforementioned precise dimensions of the alignment grooves. However, the ablation system does not produce an optically polished surface at the waveguide end face at the point where the fiber end face 16 interfaces with the IOC. Such a polished surface is necessary to avoid, inter alia, large optical insertion losses at the fiber/waveguide interface due to scattering.

In order to achieve the required optically polished surface, a commercially available dicing saw or other suitable cutting means is utilized to cut into the IOC. The cut forms a planar surface 30 which is normal or at an angle with respect to both an optical axis of the waveguide 24 and an axis of the alignment groove. Illustrated in FIG. 3 is a similar cut and resulting planar surface 30 on each side of the rectangular-shaped IOC.

The cut is at a depth, $t_2$, that is less than the entire thickness, $t_1$, of the IOC. For a typical IOC thickness, $t_1$, of 500-1000 microns, the depth of cut may be, e.g., 100 microns. However, it is to be understood that the depth of cut as described herein is purely exemplary; the depth depends upon the thickness of the IOC and the diameter of the fiber. A suitable depth of cut is easily obtainable in light of the teachings herein.

It has been found that the aforementioned step of cutting with a dicing saw has the additional result of producing an optically-polished, knife edge surface 30. Thus, this step of cutting eliminates the labor-intensive and time-consuming step of polishing, as taught by the aforementioned Courtney et al. patent, which is hereby incorporated by reference. Further, if only the step of forming the alignment groove with the ablation system was performed, polishing of certain surfaces within the groove using conventional polishing means would be nearly impossible.

Also, it is to be understood that the aforementioned steps of forming the alignment groove with the ablation system and cutting with the dicing saw to form the cut surface may be performed in either order, in accordance with the broadest scope of the present invention.

Next, the fibers 10 are placed within the corresponding alignment grooves 26. In FIG. 3 is illustrated an IOC with three grooves, each one to interface an associated fiber in precise optical alignment with each of the three legs of the waveguide 24. However, only two fibers are illustrated in FIG. 3 as placed within a corresponding groove; the groove without the fiber is shown for better understanding of the dimensional nature of the groove.

The precise positioning of the grooves in the IOC by the laser ablation system is such that the fibers within the grooves are in a relatively precise optical alignment with the waveguide. However, further alignment may be necessary, and may be performed using known automatic or manual means. For example, light from a laser or light emitting diode (LED) may be directed into the end of the fiber core not positioned adjacent to the cut surface 30. A light detector is placed at an output of the waveguide. The position of the fiber core relative to the waveguide is then adjusted for a desired (i.e., maximum) optical energy coupling efficiency as determined by the detector.

At maximum coupling efficiency, the fiber end face 16 is secured to the cut surface 30 with an adhesive, such as a commercially available UV-curable optical epoxy. If desired, however, the epoxy may be applied to the fiber end face before positioning of the fiber is undertaken. In any event, once the desired positioning of the fiber with respect to the waveguide is achieved, the optical epoxy is cured by exposure to UV light. As a final step in the method of the present invention, the fiber 10 is attached to the alignment groove 26 with a similar optical epoxy or by other means, such as low temperature glass, solder, or other techniques which should be readily apparent to one of ordinary skill in the art.

Figure 4:
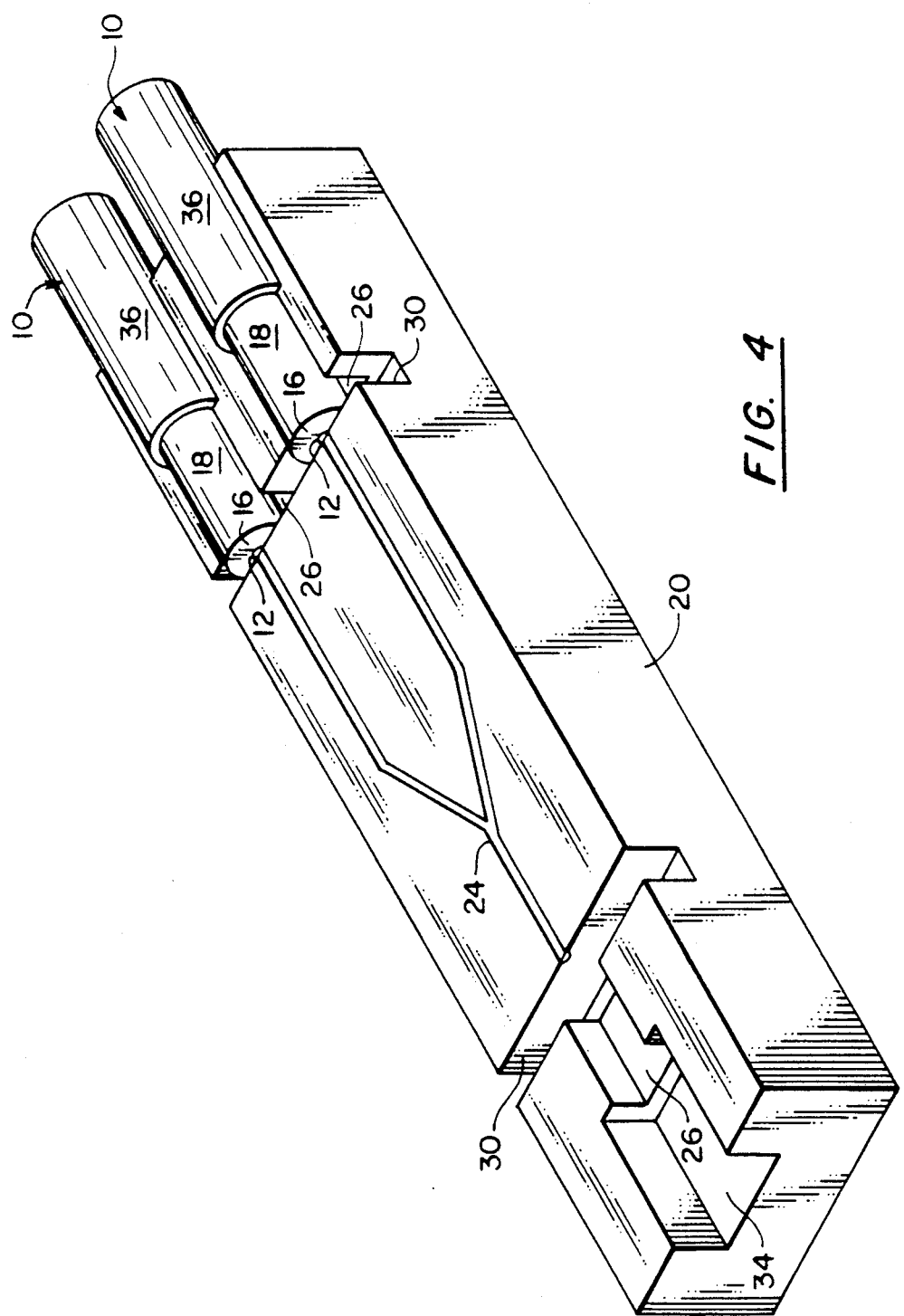
FIG. 4 is a perspective view of a number of fibers, similar to the fiber of FIG. 1, attached to the IOC as in FIG. 3 as a result of the method of the present invention.

Referring to FIG. 4, there illustrated is an IOC which is similar in most respects to that of FIG. 3, except that a portion 34 of each alignment groove is enlarged to accommodate both the optical fiber 10 and the outer buffer 36 disposed over the cladding portion 14, typical of most commercial fibers. Thus, as can be seen in FIG. 3, the alignment groove has two portions 26 and 34, having different widths and depths to accommodate the different outer diameter dimensions as between the fiber cladding 14 and outer buffer 36. These different groove dimensions are readily obtainable with the aforementioned laser ablation system. The outer buffer portion is secured to the corresponding portion 34 of the groove in a similar manner using, e.g. UV-curable adhesive or other suitable means.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

We claim:

1. A method of aligning a core of an optical fiber with an optical axis of a waveguide formed on a surface of an integrated optical chip (IOC) comprised of lithium niobate or other suitable material, and of attaching the fiber to the IOC, comprising the steps of:
   forming an alignment groove in the waveguide surface of the IOC by utilizing a laser ablation system to remove a predetermined portion of the IOC material;
   cutting into the IOC with a dicing saw or other suitable cutting means at a depth less than the thickness of the IOC to form a cut surface which is normal or at an angle with respect to both an optical axis of the waveguide and to an axis of said alignment groove, said step of cutting performing the additional function of optically polishing and providing a knife edge on said cut surface;
   positioning the fiber in said alignment groove such that an end face of the fiber is adjacent to said cut surface;
   attaching the fiber end face to said cut surface with adhesive or other suitable means; and
   attaching the fiber outer surface to said alignment groove with adhesive or other suitable means.

2. The method of claim 1, further comprising the step of:
   after positioning the fiber in said alignment groove, aligning optically the fiber core with the waveguide by translational and rotational positioning of the fiber end face adjacent to said cut surface.

3. The method of claim 2, wherein said step of aligning optically the fiber core and waveguide further comprises the steps of:
   transmitting an optical energy signal through the fiber core and into the waveguide;
   monitoring the magnitude of said optical energy signal after passing through the fiber core and waveguide;
   adjusting the optical fiber with respect to the waveguide so as to maximize said monitored magnitude of said optical energy signal.

4. The method of claim 1, wherein said step of forming an alignment groove comprises the step of removing a predetermined portion of the IOC material, said portion having a width equal to the diameter of the fiber and having a depth equal to the radius of the fiber.

5. A method of attaching an optical fiber to an integrated optical chip (IOC) comprised of lithium niobate or other suitable material, comprising the steps of:
   forming an alignment groove in the waveguide surface of the IOC by utilizing a laser ablation system to remove a predetermined portion of the IOC material;
   cutting, with a dicing saw or other suitable cutting means into the IOC at a depth less than the thickness of the IOC to form a cut surface which is normal or at an angle with respect to both an optical axis of a waveguide formed on a surface of the IOC and to an axis of said alignment groove, said step of cutting performing the additional function of optically polishing and providing a knife edge on said cut surface;
   attaching the fiber end face to said cut surface with adhesive or other suitable means; and
   attaching the fiber to said alignment groove with adhesive or other suitable means.

6. The method of claim 5, further comprising the step of:
   after positioning the fiber in said alignment groove, aligning optically the fiber core with the waveguide by translational and rotational positioning of the fiber end face adjacent to said cut surface.

7. The method of claim 6, wherein said step of aligning optically the fiber core and waveguide further comprises the steps of:
   transmitting an optical energy signal through the fiber core and into the waveguide;
   monitoring the magnitude of said optical energy signal after passing through the fiber core and waveguide;
   adjusting the optical fiber with respect to the waveguide so as to maximize said monitored magnitude of said optical energy signal.

8. The method of claim 5, wherein said step of forming an alignment groove comprises the step of removing a predetermined portion of the IOC material, said portion having a width equal to the diameter of the fiber and having a depth equal to the radius of the fiber.

9. Apparatus, comprising:
   an integrated optical chip (IOC), having a waveguide formed on a surface thereof;
   an optical fiber, having an inner core portion through which optical energy is constrained to travel, surrounded by an outer cladding portion;
   characterized by:
   an alignment groove formed in said IOC, a portion of said fiber being disposed in said alignment groove;
   a cut surface formed in said IOC, said cut surface being optically polished and normal or at an angle with respect to both an optical axis of said waveguide and an optical axis of said alignment groove; and
   an end of said fiber being attached to said IOC such that said waveguide is in a desired translational and rotational position with respect to said fiber core.

* * * * *